(12) United States Patent
Geiss

(10) Patent No.: US 11,472,297 B2
(45) Date of Patent: Oct. 18, 2022

(54) HYBRID ENERGY STORAGE SYSTEM

(71) Applicant: AIRBUS URBAN MOBILITY GMBH, Munich (DE)

(72) Inventor: Michael Geiss, Moettingen (DE)

(73) Assignee: Airbus Urban Mobility GmbH, Munich (DE)

( * ) Notice: Subject to any disclaimer, the term of this patent is extended or adjusted under 35 U.S.C. 154(b) by 107 days.

(21) Appl. No.: 17/068,979

(22) Filed: Oct. 13, 2020

(65) Prior Publication Data

US 2021/0138913 A1    May 13, 2021

(30) Foreign Application Priority Data

Nov. 12, 2019 (EP) ..................................... 19400024

(51) Int. Cl.
*B60L 50/61* (2019.01)
*B60L 50/40* (2019.01)
*B60L 50/75* (2019.01)
*B60L 1/00* (2006.01)

(52) U.S. Cl.
CPC ............... *B60L 50/61* (2019.02); *B60L 1/003* (2013.01); *B60L 50/40* (2019.02); *B60L 50/75* (2019.02); *B60L 2200/10* (2013.01)

(58) Field of Classification Search
None
See application file for complete search history.

(56) References Cited

U.S. PATENT DOCUMENTS

| | | | |
|---|---|---|---|
| 2011/0101915 A1* | 5/2011 | Mitsutani | B60L 53/305 320/109 |
| 2011/0266996 A1 | 11/2011 | Sugano | |
| 2013/0073123 A1 | 3/2013 | Westenberger et al. | |
| 2014/0152089 A1* | 6/2014 | Manabe | H02M 3/1584 307/9.1 |
| 2015/0012154 A1 | 1/2015 | Senkel et al. | |
| 2017/0057650 A1* | 3/2017 | Walter-Robinson | H02J 7/0068 |
| 2017/0203850 A1* | 7/2017 | Wang | B64C 39/024 |

(Continued)

FOREIGN PATENT DOCUMENTS

| | | |
|---|---|---|
| EP | 2817219 A1 | 12/2014 |
| EP | 3184425 B1 | 6/2017 |

(Continued)

OTHER PUBLICATIONS

European Search Report for European Application No. EP 19400024. 6, Completed by the European Patent Office, dated May 4, 2020, 16 pages.

*Primary Examiner* — Jared Fureman
*Assistant Examiner* — Joel Barnett
(74) *Attorney, Agent, or Firm* — Brooks Kushman P.C.

(57) ABSTRACT

An electrical system, and, more particularly, to an electrical system for an aircraft comprising one or more energy sinks and a hybrid energy storage system. The hybrid energy storage system may comprise one or more primary energy sources, a secondary energy source, and a secondary energy source control unit. The one or more primary energy sources may be coupled to and supply power to the one or more energy sinks. The secondary energy source may be coupled to the one or more primary energy sources and adapted to supply power at a variable output voltage to the one or more primary energy sources.

17 Claims, 6 Drawing Sheets

(56) References Cited

U.S. PATENT DOCUMENTS

2017/0305548 A1\* 10/2017 Ozaki .................... B64D 27/02
2020/0115062 A1    4/2020 Klonowski et al.

FOREIGN PATENT DOCUMENTS

| WO | 2013124300 A1 | 8/2013 |
| WO | 2016067488 A1 | 5/2016 |
| WO | 2018060591 A1 | 4/2018 |
| WO | 2018175349 A1 | 9/2018 |

\* cited by examiner

HYBRID ENERGY STORAGE SYSTEM

CROSS-REFERENCE TO RELATED APPLICATIONS

This application claims priority to European patent application No. EP 19400024.6 filed on Dec. 11, 2019, the disclosure of which is incorporated in its entirety by reference herein.

BACKGROUND OF THE INVENTION

(1) Field of the Invention

The present embodiments relate to an electrical system, and, more particularly, to an electrical system for an aircraft comprising one or more energy sinks and a hybrid energy storage system.

(2) Description of Related Art

System applications with electrical systems having an energy source and energy sinks that perform, at least in some scenarios, safety-critical operations are found in many places, such as spacecraft, aircraft, motor vehicles, drones, alarm systems, power plants, just to name a few. Examples for safety-critical operations, which are sometimes also referred to as mission-critical operations, performed by electrical systems in an aircraft include controlling the aircraft's roll, pitch, yaw, and thrust. A failure of any of these safety-critical operations under certain conditions can potentially lead to an instable motion of the aircraft with life endangering consequences. Thus, the continued, uninterrupted, fail-safe operation of these electrical systems and thus of the corresponding system application is often required.

In particular, a loss of lift power avoidance is very important for an aircraft's propulsion unit and involves high qualification efforts on an architectural level. For example, the European Union Aviation Safety Agency (EASA) has released a Special Condition for type certification of small vertical take-off and landing (VTOL) aircraft (SC-VTOL-01) on Jul. 2, 2019, in which, VTOL aircraft that are certified in the category Enhanced would have to meet requirements for continued safe flight and landing, and be able to continue to the original intended destination or a suitable alternate vertiport after a failure.

In the category Enhanced, failure conditions that would prevent continued safe flight and landing of the aircraft are considered catastrophic. A quantitative safety objective in the category Enhanced determines that catastrophic failure conditions have to occur at a rate that is smaller than or equal to $10^{-9}$ occurrences per flight hour.

Regulations such as SC-VTOL-01 have a big impact on the design of electrical energy storage systems and power distribution systems that operate mission-critical electrical energy sinks. In fact, these electrical energy storage systems and power distribution systems have to be designed to guarantee the imposed predetermined failure conditions, and conventional energy storage systems that use a single state-of-the-art energy source may not be adapted in terms of power and energy density for such a mission-critical electrical energy sink.

As a result, electrical energy sources are often oversized to compensate for potential power loss or energy loss failure conditions at the cost of a significant weight increase. For example, a primary power distribution system within a vehicle may have multiple energy sources, which are either electrically segregated from each other during normal operation, or which are connected in parallel during normal operation.

Such primary power distribution systems usually react to emergency conditions (e.g., network failures or energy sink failures), by using switching devices that isolate the failure and continue to supply power to the mission-critical electrical energy sinks. However, both concepts, the electrically segregated energy sources and the energy sources that are connected in parallel, are confronted with different drawbacks.

The electrically segregated energy sources of the power distribution system prevent the electrical energy sources from feeding an overload current or a short circuit current, which may potentially lead to a power interrupt at the corresponding electrical energy sink.

However, in case of a failure at one of the segregated electrical energy sources, a power interrupt at a corresponding mission-critical electrical energy sink may occur. To ensure that mission-critical electrical energy sinks remain operational, a loss of an electrical energy source usually ensues a reconfiguration of the power distribution system. The reconfiguration of the power distribution system is performed using switching devices such as electromechanical contactors or semiconductor switches that connect the mission-critical electrical energy sinks to a backup electrical energy source.

The backup electrical energy source can either be another electrical energy source of the power distribution system or a dedicated independent emergency energy source. In both cases, the backup electrical energy source needs to be dimensioned to cover the power and energy demands of all the mission-critical electrical energy sinks to which it is connected as a result of the reconfiguration. In the worst-case scenario, in which all newly connected electrical energy sinks and all originally connected electrical energy sinks perform mission-critical operations, the backup electrical energy source needs to be dimensioned to cover the power and energy demands of all the newly connected electrical energy sinks in addition to the originally connected electrical energy sinks.

At a nominally connected primary power distribution system, the primary electrical energy sources are connected in parallel during normal operation. This reduces the risk of power interrupts at electrical energy sinks in case of a primary electrical energy source loss. However, very high overload currents or short circuit currents may occur until the failure path is isolated by electrical reconfiguration.

All primary electrical energy sources and the associated interconnections downstream from the respective electrical energy sources to the failure location are exposed to high failure currents until the overload condition has been isolated. Thus, all primary electrical energy sources, the electrical switching devices (e.g. fault current protection switches) and the associated interconnections must be dimensioned to withstand these overload conditions.

Furthermore, all primary electrical energy sources sink their power to the failure location until the segregation between the electrical energy sources is completed, which increases the risk of an electrical power interrupt at mission-critical electrical energy sinks.

The principles of failure management require that the electrical energy sources and the mission-critical electrical energy sinks are qualified against failure scenarios, use monitoring functions to detect failure events, use reconfiguration switching devices with corresponding control mechanisms, are qualified with respect to power interruption times until buffering of backup electrical energy sources and with respect to the performance of the backup electrical sources during emergency conditions.

Thereby, the principles of failure management lead to an increased certification complexity and certification effort. For example, an oversizing of the primary power distribution with a significant weight impact is often required to satisfy the power supply during an emergency condition.

Recent state-of-the-art electrical power train applications use a hybrid electrical energy storage system that combines power optimized sources (e.g., high-power batteries) with energy optimized sources (e.g., gen set). Thereby, the increased complexity of the hybrid electrical energy storage system is traded-off against a reduction in weight and an optimization of performance.

The contribution of the energy optimized sources to the load is often actively steered to optimize the hybrid electrical energy storage system with respect to the overall energy and power density. The active steering of the contribution of the energy optimized sources to the load may be implemented using switching power electronic components and/ or a DC/DC converter for each one of the power and energy optimized sources.

However, the increased complexity of hybrid electrical energy storage systems may affect reliability and failure robustness. Therefore, high qualification efforts are often required if mission-critical electrical energy sinks are connected to a hybrid electrical energy storage system.

Document WO 2018/060591 A1 describes a hybrid propulsion system for a multirotor rotary wing aircraft that comprises at least one inverter configured to supply power in parallel to multiple electric motors intended to drive the corresponding propellers of the system. In particular, the hybrid propulsion system comprises an internal combustion engine and an electric generator coupled to the internal combustion engine so that, in operation, the internal combustion engine drives the electric generator, a rectifier connected to the electrical generator for converting an alternating current delivered by the electrical generator into a direct current, conversion means configured to convert the direct current to alternating current, and an electrical network connecting the rectifier to the means of conversion, at least a first group of at least two first electric motors connected to the conversion means so that in operation, the conversion means supply the first electric motors with alternating current, and propellers respectively coupled to the first electric motors so that in operation, the first electric motors drive the propellers, characterized in that the conversion means comprise a first inverter configured to supply in parallel the first electric motors.

However, the power management control of the presented hybrid propulsion system has a comparatively high complexity that requires comparatively high qualification efforts. Furthermore, there is no primary source associated with the load. Instead, a single main source supplies all loads. Thus, significant oversizing at the battery level and/or the genset level is required, to either compensate a genset loss, which has a probability of approximately $10^{-5}$ occurrences per flight hour, or a buffer battery loss, which has a probability of approximately 10 occurrences per flight hour. Either way, it is very likely that the proposed hybrid propulsion system has difficulties to reach the failure rate of less than $10^{-9}$ occurrences per flight hour that is required for supplying critical loads like propulsion units.

Documents WO 2018/175349 A1, WO 2016/067488 A1, and EP 2 817 219 A1 describe hybrid powertrains that are similar to and have the same disadvantages as the hybrid propulsion system of document WO 2018/060591 A1.

Document EP 3 184 425 B1 describes a multirotor aircraft with at least two thrust producing units, the multirotor aircraft being adapted for transportation of passengers and comprising an aircraft operating structure that is adapted for operation of the multirotor aircraft in failure-free operating mode, and a redundant security architecture that is at least adapted for operation of the multirotor aircraft in case of a failure of the aircraft operating structure in operation, the redundant security architecture being provided to comply with applicable authority regulations and certification requirements regarding passenger transportation.

However, the redundant security architecture is lacking a hybrid electrical energy storage system. Thus, an oversizing of the primary power distribution with a significant weight impact is very likely required to satisfy the power supply during an emergency condition.

In summary, conventional energy storage and power distribution systems that use a single type of energy source technology may lack the required power and energy density for supplying mission-critical electrical energy sinks without a significant oversizing of the energy storage modules.

Thus, hybrid electrical energy storage systems that combine energy optimized energy sources with power optimized energy sources were recently introduced. Such hybrid electrical energy storage systems allow to optimize the power distribution working points during power or energy intensive vehicle operation phases such as take-off and landing or cruise flight. However, many state-of-the-art hybrid electrical energy storage systems have a comparatively high complexity and low robustness.

Document US 2017/203850 A1 describes a hybrid power system that comprises a power controller adapted to be in communication with a first power source, a second power source, and a load. The power controller may be configured to detect whether a current drawn by the load exceeds a predetermined threshold, control discharging of the first power source without permitting discharging of the second power source to power the load when the current drawn by the load is less than the predetermined threshold current, and control discharging of the first power source and the second power source to power the load when the current drawn by the load is greater than the predetermined threshold current.

Document US 2017/057650 A1 describes a system for providing regenerative power for an aircraft to sustain flight that includes multiple energy cells disposed within the aircraft, the energy cells being configured to supply power to a propulsion motor and electronics of the aircraft, a fan generator harnessing propeller blast created by an aircraft propeller and converting kinetic energy of the propeller blast into electrical energy, a charger receiving the electrical energy generated by the fan generator and using the electrical energy to recharge one or more of the energy cells, and a power transfer switch selectively connecting one of the energy cells to the propulsion motor and electronics of the aircraft, such that the energy cells are rotated one at a time to power the propulsion motor and electronics. During recharging, the one or more of the energy cells are disconnected by the power transfer switch.

BRIEF SUMMARY OF THE INVENTION

It is, therefore, an objective to provide a new electrical system for an aircraft. The new electrical system should enable simplified working point optimization, have a lower complexity, and require lower qualification efforts than conventional power distribution systems. Furthermore, compared to conventional power distribution systems the new electrical system should be more robust and reliable and offer a simpler and more robust concept to cover energy source failure conditions and overload conditions without risk of interrupts.

The objective is solved by an electrical system comprising the features of claim 1. More specifically, an electrical system for an aircraft may comprise a hybrid energy storage system and one or more energy sinks, wherein each energy sink of the one or more energy sinks comprises a load. The hybrid energy storage system may comprise one or more primary energy sources, a secondary energy source, and a secondary energy source control unit. The one or more primary energy sources may be coupled to the one or more energy sinks and supply power to the one or more energy sinks, wherein each primary energy source of the one or more primary energy sources comprises an energy storage unit that stores electrical energy and supplies power at a predetermined voltage range, and an electrical energy source management unit that collects sensor data from the energy storage unit. The secondary energy source may be coupled to the one or more primary energy sources and adapted to supply power at a variable output voltage to the one or more primary energy sources. The secondary energy source control unit may receive the sensor data from the electrical energy source management unit and send command signals to the secondary energy source to control the variable output voltage based on the sensor data. The secondary energy source control unit may be adapted to directing the secondary energy source to adjust the variable output voltage to a value that is smaller or greater than the predetermined voltage range of at least one of the one or more primary energy sources.

Illustratively, the electrical system describes a robust way of realizing a hybrid energy storage system. In particular, the electrical system covers the electrical power distribution system principle and the hybrid energy storage principle through interactions between primary energy sources and secondary energy sources.

Thereby, the hybrid energy storage system can be extended from 1 to n branches (i.e., 1 to n primary energy sources connected to 1 to n electrical energy sinks). The 1 to n branches may be coupled in parallel to at least one secondary energy source using an electric backbone.

By way of example, dedicated control logic may control each secondary energy source. If desired, each secondary energy source may have its separate dedicated control logic. The dedicated control logic may gather sensor data from the respective source management units (SMU) of the respective primary energy sources within the hybrid energy storage system.

In other words, the electric backbone may have a common voltage potential that enables a connection of the at least one secondary energy source with each primary energy source of the hybrid energy storage system.

By way of example, the primary energy source switching devices may be implemented using power diode modules. If desired, an electrical vehicle may include one or more hybrid energy storage systems. For example, an electrical vehicle may have two independent hybrid energy storage systems.

If desired, the secondary energy source of the hybrid energy storage system may perform buffering tasks. For example, the secondary energy source may allow to optimize the working point of the primary energy sources at different load conditions. Thus, the secondary energy source may enable downsizing and hence weight reduction of the primary energy sources.

Furthermore, the secondary energy source can act as an emergency/backup source that takes over the respective electrical energy sink in case of a primary energy source loss. The secondary energy source may comprise energy optimized batteries, generators driven by combustion engine, fuel cells, a supercapacitor, an ultracapacitor, etc.

Depending on the load profile, the secondary energy source control can actively lower the consumption of the primary energy source (e.g., by setting the output voltage of the secondary energy source to a value that is greater than the bus bar voltage of the primary energy source). Thus, the secondary energy source may act as a range extender, for example in case of power reduced and energy intensive load conditions.

The primary energy source may be dimensioned for its nominal condition. In other words, the primary energy source does not need to be oversized to compensate for other primary energy sources in case of a failure of one or more of these other primary energy sources. Thus, the primary energy source may be downsized compared to state-of-the-art energy sources due to the buffer properties (e.g. lower load peaks) of the secondary energy source.

Furthermore, a potential loss of the secondary energy source can be considered as an emergency load case and as a sizing criterion for the primary energy source. The arrangement of the primary energy sources' switching elements simplifies the control logic of the secondary energy source control and the monitoring and protection logic of the primary energy source.

Thus, a simple and robust hybrid energy storage system can be realized. Such a hybrid energy storage system can be used for safety critical vehicle applications e.g., supplying critical consumers, because it achieves the required reliability figures at a quantitative safety assessment. Moreover, the reduced complexity combined with the increased robustness of the hybrid energy storage system decreases the certification efforts compared to state-of-the-art energy storage systems.

The proposed architecture of the hybrid energy storage system eliminates the need for a dedicated electrical power distribution system (e.g. stand-alone distribution boxes having own intelligence), which is usually required to re-route the remaining power from the energy sources to critical consumers (e.g., by electrical reconfiguration) in case of an energy source loss or malfunction. Thus, as a side effect of the proposed hybrid energy storage system, an overall reduction in complexity of the power distribution system can be achieved.

Furthermore, the voltage-controlled output of the secondary energy source can be combined with an energy management system in a way that the contribution of the secondary energy source to the primary bus is always ideal, e.g. following active energy reduction strategies depending on flight state and remaining capacity of the secondary energy source.

Contrary to state-of-the-art hybrid energy storage systems, the herewith presented hybrid energy storage system comprises one voltage-controlled energy source that is combined with at least one primary energy source, which reduces the complexity of the hybrid energy storage system to a minimum.

Additionally, the hybrid energy storage system allows the implementation of further vehicle operational modes, like auxiliary power supply unit functionalities, e.g. to extent ground operation modes, electrical taxiing, etc.

Furthermore, a dedicated charging mode in which the secondary energy source recharges the primary energy sources (e.g., while on ground) is introduced.

According to one aspect, the secondary energy source further comprises a negative output port and a positive output port, wherein the variable output voltage is supplied between the positive output port and the negative output port.

According to one aspect, the secondary energy source further comprises a buffer that is coupled between the positive and negative output ports.

According to one aspect, the secondary energy source further comprises an energy storage component that comprises at least one of a battery, a supercapacitor, an ultracapacitor, a fuel cell, or an engine-generator set.

According to one aspect, the secondary energy source further comprises a voltage control unit that is coupled between the energy storage component and the positive and negative output ports, wherein the voltage control unit supplies the variable output voltage between the positive and negative output ports based at least in part on the command signals.

According to one aspect, the voltage control unit sends feedback signals to the secondary energy source control unit, and the command signals from the secondary energy source control unit are based at least in part on the feedback signals.

According to one aspect, the voltage control unit comprises at least one of a rectifier, a DC/AC converter, a DC/DC converter, or a stabilizing buffer.

According to one aspect, an energy sink of the one or more energy sinks comprises a three-phase AC machine, and a DC/AC converter that is coupled between a primary energy source of the one or more primary energy sources and the three-phase AC machine.

According to one aspect, each primary energy source of the one or more primary energy sources supplies power to exactly one energy sink of the one or more energy sinks.

According to one aspect, at least one primary energy source of the one or more primary energy sources further comprises a positive input port, a negative input port, wherein the positive and negative input ports are coupled to the secondary energy source, a positive output port, a negative output port, wherein the positive and negative output ports are coupled to at least one of the one or more energy sinks, and a bus bar that is coupled between the energy storage unit and the positive input and output ports.

According to one aspect, the at least one primary energy source of the one or more primary energy sources further comprises a primary switch arrangement that is coupled between the energy storage unit and the bus bar.

According to one aspect, the primary switch arrangement further comprises a primary switch diode that is arranged in forward direction from the energy storage unit to the bus bar, and a primary switch contactor that is arranged in parallel to the primary switch diode between the energy storage unit and the bus bar.

According to one aspect, the at least one primary energy source of the one or more primary energy sources further comprises an input switch that is coupled between the positive input port and the bus bar, wherein the input switch comprises at least one of an electromechanical switch, a semiconductor based switch, or a diode in forward current direction to the bus bar.

According to one aspect, the at least one primary energy source of the one or more primary energy sources further comprises an output switch that is coupled between the bus bar and the positive output port, wherein the output switch comprises at least one of an electromechanical switch or a semiconductor based switch.

According to one aspect, the at least one primary energy source of the one or more primary energy sources further comprises a protection switch that is coupled between the negative input and output ports and the energy storage unit for disconnecting the energy storage unit from the positive and negative input and output ports, wherein the protection switch comprises at least one of an electromechanical switch, a semiconductor based switch, a fuse, or a circuit breaker.

BRIEF DESCRIPTION OF THE DRAWINGS

Embodiments are outlined by way of example in the following description with reference to the attached drawings. In these attached drawings, identical or identically functioning components and elements are labelled with identical reference numbers and characters and are, consequently, only described once in the following description.

DETAILED DESCRIPTION OF THE INVENTION

Exemplary embodiments may be included in any application that includes an electrical energy source and an electrical energy sink that performs safety-critical operations. The electrical energy sink may perform safety-critical operations under predetermined circumstances (e.g., when operating under certain conditions), at predetermined times (e.g., at predetermined time intervals), or exclusively (i.e., under any condition and at all times).

Figure 1:
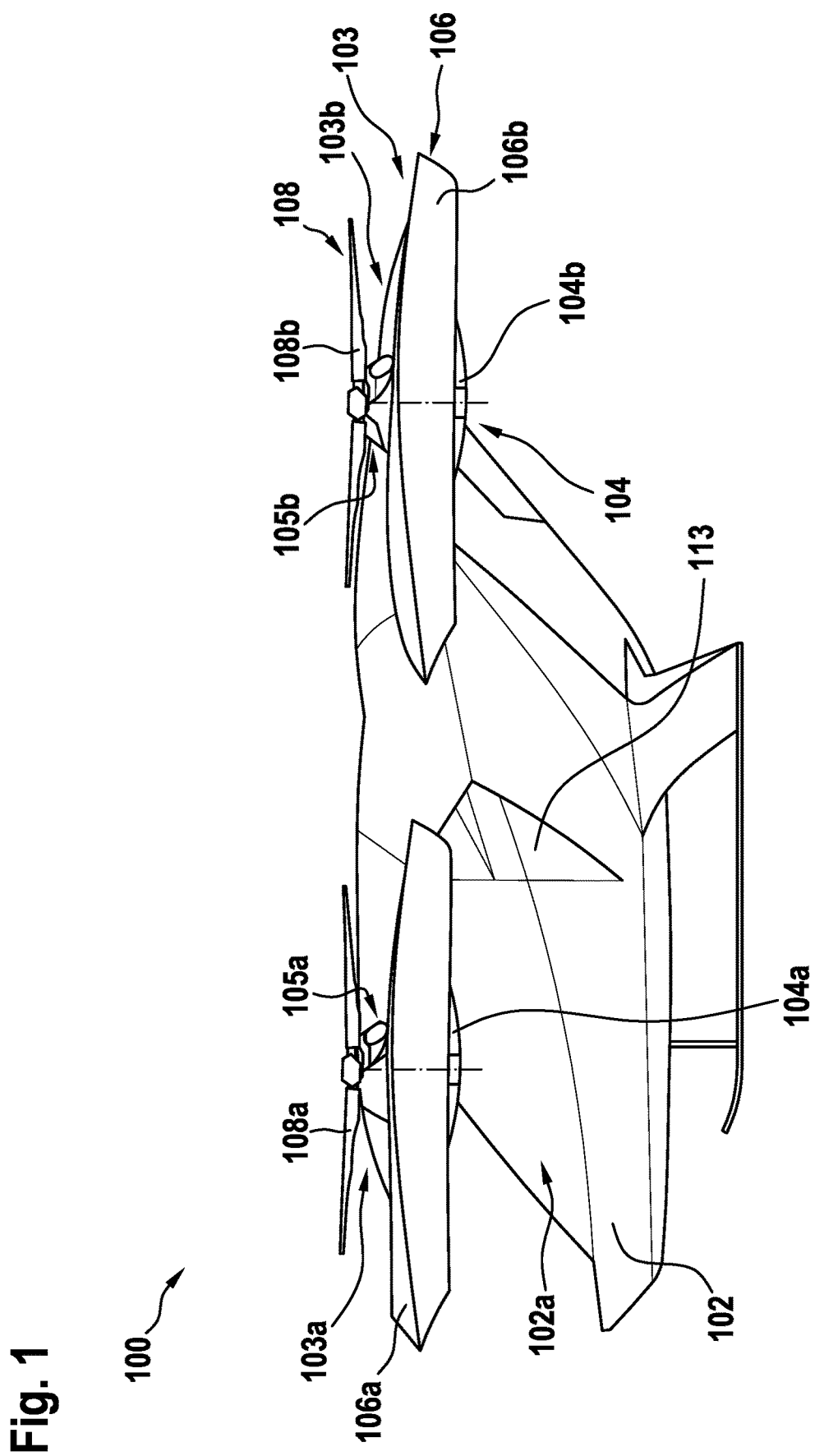
FIG. 1 is a diagram of a side view of an illustrative rotary-wing aircraft with an exemplary hybrid energy storage system that powers thrust producing units in accordance with some embodiments.

For example, embodiments may be included in transportation vehicles. FIG. 1 shows an example of a transportation vehicle. A transportation vehicle may be a spacecraft, an aircraft, a car, a bus, a truck, or a train, just to name a few. As shown in FIG. 1, the transportation vehicle may be an aircraft 100 that is exemplarily illustrated as a rotary-wing aircraft 100.

Rotary-wing aircraft 100 may have an aircraft airframe 102. The aircraft airframe 102 defines a supporting structure of aircraft 100 that is also referred to hereinafter as the fuselage 102 of the rotary-wing aircraft 100.

The aircraft airframe 102 may be provided with an outer shell 113 that defines an internal volume 102a. Illustratively, the internal volume 102a may be adapted for the transportation of passengers, so that the rotary-wing aircraft 100 as a whole is adapted for transportation of passengers. The internal volume 102a may be adapted for accommodating operational and electrical equipment, such as e.g. a hybrid energy storage system that is required for operation of the rotary-wing aircraft 100.

It should be noted that exemplary configurations of the internal volume 102a that are suitable for transportation of passengers, but also for accommodation of operational and electrical equipment, are readily available to the person skilled in the art and generally implemented to comply with applicable authority regulations and certification requirements regarding passenger transportation. Thus, these configurations of the internal volume 102a are not described in detail for brevity and conciseness.

By way of example, the rotary-wing aircraft 100 comprises a predetermined number of thrust producing units 103. If desired, the predetermined number of thrust producing units 103 comprises at least two thrust producing units 103a, 103b. If desired, the predetermined number of thrust producing units 103 may be more than two. For example, rotary-wing aircraft may comprise three, four, or more thrust producing units.

It should be noted that the thrust producing units 103a, 103b are all exemplarily arranged laterally with respect to the fuselage 102. In other words, thrust producing units of the predetermined number of thrust producing units 103 are exemplarily arranged on the left or right side of the fuselage 102 seen in its longitudinal direction. Accordingly, in FIG. 1 only the thrust producing units 103a, 103b are visible, while other thrust producing units of the predetermined number of thrust producing units 103 may be masked by fuselage 102.

If desired, two additional thrust producing units may be embodied in an axially symmetrical manner with respect to the thrust producing units 103a, 103b, wherein a longitudinal center axis in the longitudinal direction of fuselage 102 defines the symmetry axis. Accordingly, only the thrust producing units 103a, 103b and their constituent elements are described in more detail hereinafter, while a more detailed description of the additional thrust producing units is omitted for brevity and conciseness.

The thrust producing units 103a, 103b are embodied for producing thrust in a predetermined direction in operation such that the rotary-wing aircraft 100 is able to hover in the air as well as to fly in any forward or rearward direction.

Illustratively, the thrust producing units 103a, 103b are structurally connected to a predetermined number of structural supports 104, which may include at least two structural support members. Illustratively, the predetermined number of structural supports and the predetermined number of thrust producing units 103 form a thrust producing units arrangement.

By way of example, one or more of the thrust producing units 103a, 103b may comprise an associated shrouding in order to improve underlying aerodynamics and to increase operational safety. By way of example, a plurality of shrouding units 106 is shown with two separate shroudings 106a, 106b. Illustratively, the shrouding 106a is associated with the thrust producing unit 103a, and the shrouding 106b with the thrust producing unit 103b.

If desired, the shroudings 106a, 106b may be connected to the predetermined number of structural supports 104. More specifically, the shrouding 106a is preferably connected to the structural support member 104a, and the shrouding 106b to the structural support member 104b.

According to one aspect, at least one and, preferably, each one of the thrust producing units 103a, 103b is equipped with at least one rotor assembly. By way of example, the thrust producing unit 103a is equipped with a rotor assembly 108a, and the thrust producing unit 103b is equipped with a rotor assembly 108b. The rotor assemblies 108a, 108b illustratively define a plurality of rotor assemblies 108, which is preferably mounted to the plurality of shroudings 106.

The plurality of rotor assemblies 108 may be powered by an associated plurality of engines 105a, 105b. If desired, rotary wing aircraft may have an electrical system that comprises a hybrid energy storage system and one or more electrical energy sinks. For example, the plurality of engines 105a, 105b may be embodied as electrical engines and thus as electrical energy sinks. Illustratively, rotor assembly 108a may be powered by electrical engine 105a and rotor assembly 108b may be powered by electrical engine 105b.

The plurality of engines 105a, 105b that powers the plurality of rotor assemblies 108 are part of the safety-critical components, which are sometimes also referred to as the mission-critical components or mission-critical electrical energy sinks of the rotary-wing aircraft 100. Accordingly, a fail-safe electrical drive unit may implement at least one of electrical engines 105a, 105b. If desired, the fail-safe electrical drive unit may be one of the one or more energy sinks 240 of FIG. 2.

Figure 2:
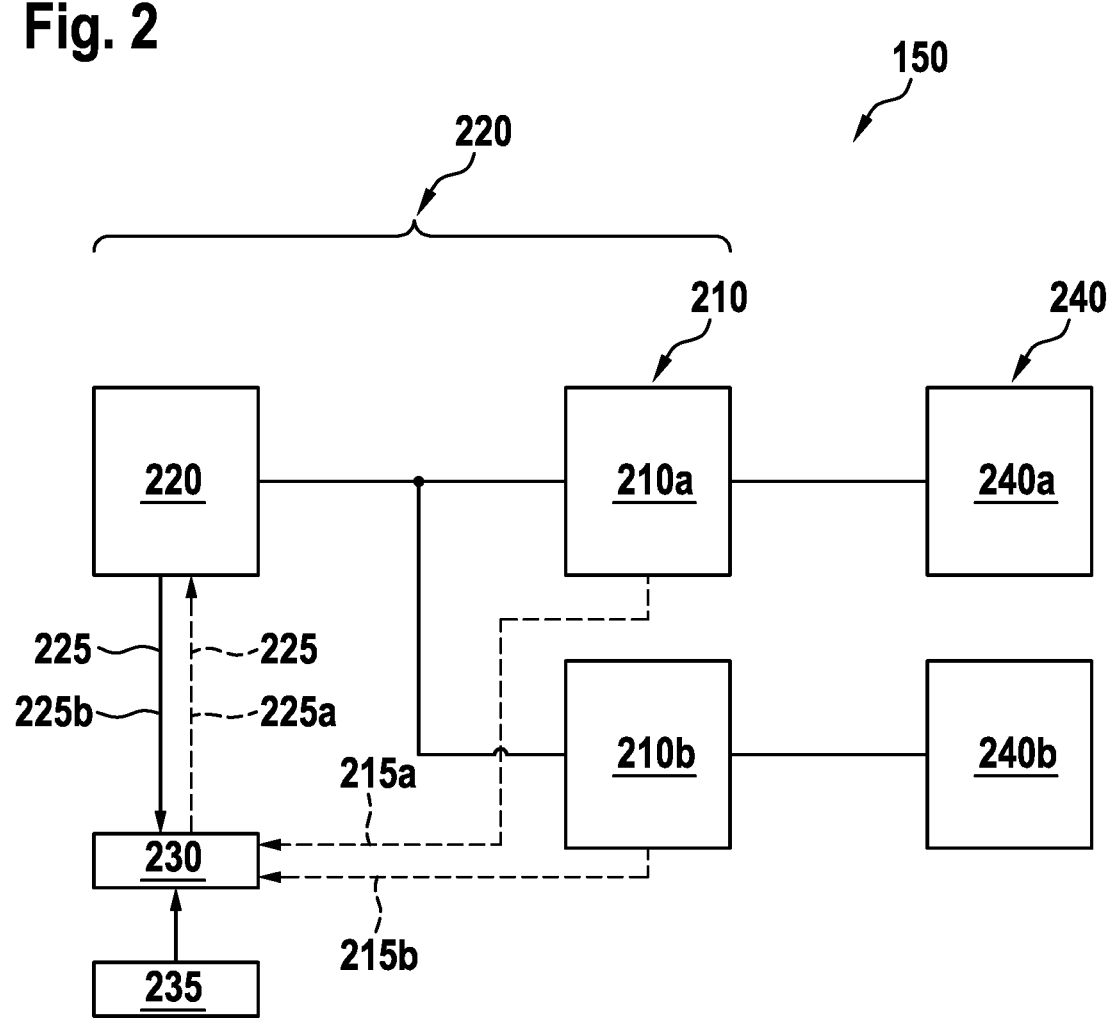
FIG. 2 is a diagram of an illustrative electrical system having a hybrid energy storage system with a secondary energy source and two primary energy sources that supply power to two energy sinks in accordance with some embodiments.

The mission-critical electrical energy sinks of rotary-wing aircraft 100 may be powered by the hybrid energy storage system, if desired. FIG. 2 is a diagram of an illustrative electrical system 150 having a hybrid energy storage system 200 with a secondary energy source and two primary energy sources that supply power to two energy sinks in accordance with some embodiments.

As shown, electrical system 150 may include energy sinks 240. Energy sinks 240 may include any electrical component that transforms electrical energy into some other form of energy, which may include electrical energy, thermal energy, mechanical energy, electromagnetic energy, sound energy, chemical energy, or a combination thereof.

As an example, energy sinks 240 may include an electric motor that transforms electrical energy into mechanical energy, sound, and heat. As another example, energy sinks 240 may include a light bulb that transforms electrical energy into light and heat. If desired, energy sinks 240 may perform mission-critical operations. As an example, energy sinks 240 may include electrical engines 105a, 105b that power the plurality of rotor assemblies 108 of rotary-wing aircraft 100 of FIG. 1.

Each energy sink 240a, 240b of energy sinks 240 may have one or more loads (e.g., electrical engines 105a, 105b of FIG. 1). If desired, each energy sink may include a single load (e.g., energy sink 240a has electrical engine 105a and energy sink 240b has electrical engine 105b of FIG. 1).

Energy sink 240a and/or 240b may perform safety-critical operations and/or mission-critical operations. Energy sink 240a and/or 240b may perform safety-critical and/or mission-critical operations under predetermined circumstances (e.g., when operating under certain conditions), at predetermined times (e.g., at predetermined time intervals), or exclusively (i.e., under any condition and at all times).

Illustratively, electrical system 150 may include a hybrid energy storage system 200. Hybrid energy storage system 200 may include primary energy sources 210 that are coupled to energy sinks 240 and supply power to energy sinks 240.

If desired, each primary energy source of primary energy sources 210 may be coupled to and supply power to energy sinks 240. For example, each primary energy source 210a, 210b of primary energy sources 210 may be associated with and supply power to exactly one energy sink of energy sinks 240. As shown, primary energy source 210a is coupled to and supplies power to energy sink 240a and primary energy source 210b to energy sink 240b.

Each primary energy source 210a, 210b contains an electrical energy storage device. The electrical energy storage device may be any apparatus able to store and provide electricity to electrical energy sinks 240. For example, primary energy source 210a, 210b may include a lithium ion rechargeable battery, a nickel cadmium rechargeable battery, a lithium ion polymer rechargeable battery, a nickel metal hydride battery, or any other rechargeable or non-rechargeable battery.

If desired, primary energy source 210a, 210b may include at least one of a supercapacitor, an ultracapacitor, a fuel cell, an engine-generator set, etc. which are sized to provide power to the corresponding energy sink 240a, 240b.

Illustratively, hybrid energy storage system 200 may include a single secondary energy source 220 that is coupled to primary energy sources 210 and adapted to supply power at a variable output voltage to primary energy sources 210. For example, the single secondary energy source 220 may supply power at a variable output voltage to at least two primary energy sources 210a, 210b.

By way of example, hybrid energy storage system 200 may include more than one secondary energy sources 220, and each secondary energy source 220 of the more than one secondary energy sources 220 may be associated with one primary energy source. If desired, at least one secondary energy source 220 of the more than one secondary energy sources 220 may be associated with at least two primary energy sources 210a, 210b.

Secondary energy source 220 may have an energy storage component. The energy storage component of secondary energy source 220 may include at least one of a battery, a supercapacitor, an ultracapacitor, a fuel cell, an engine-generator set, or any other device suitable to store or supply energy in form of electricity.

Secondary energy source 220 may be provided with means for controlling the output voltage. For example, secondary energy source 220 may include at least one of a rectifier, an inverter, a DC/DC converter, or any other means suitable to adjust the output voltage of secondary energy source 220.

The selected means for controlling the output voltage may be dependent on the output current type of the energy storage component. As an example, a three-phase AC generator may require means for controlling the output voltage that include a three-phase inverter. As another example, a fuel cell may require means for controlling the output voltage that include a DC/DC converter.

Figure 4:
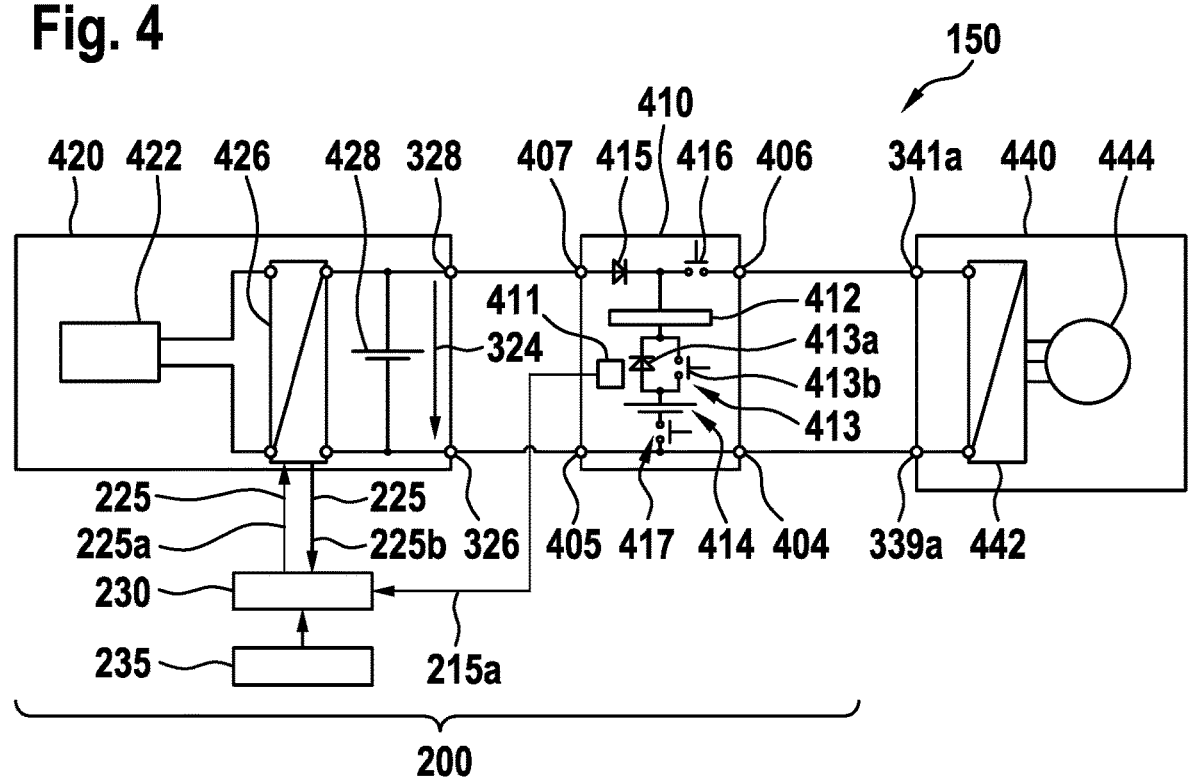
FIG. 4 is a diagram of an illustrative electrical system showing a hybrid energy storage system with a secondary energy source and a single primary energy source that supplies power to a single energy sink with an electric motor in accordance with some embodiments.

If desired, a buffer that may include a battery, a supercapacitor, or any other suitable buffering device may be installed parallel to the controllable means at the output of the secondary energy source 220 (e.g., buffer 428 of FIG. 4).

Secondary energy source 220 may be sized to support primary energy sources 210 when defined failure conditions are fulfilled. Illustratively, hybrid energy storage system 200 may include a secondary energy source control unit 230.

Secondary energy source control unit 230 may receive sensor data 215a, 215b from primary energy sources 210a, 210b, respectively. Secondary energy source control unit 230 may send command signals 225a to secondary energy source 220 to control the variable output voltage of secondary energy source 220 based on sensor data 215a, 215b from primary energy sources 210a, 210b.

Secondary energy source 220 may send feedback signals 225b to secondary energy source control unit 230. Feedback signals 225b may form a control loop 225 together with command signals 225a. If desired, command signals 225a from the secondary energy source control unit 230 may be based at least partially on feedback signals 225b.

Illustratively, secondary energy source control unit 230 may control the level of output contribution that secondary energy source 220 contributes to the primary energy sources 210. For example, secondary energy source control unit 230 may set a constant output voltage at secondary energy source 220 independent of the load condition at the respective primary energy sources 210a, 210b.

If desired, a control function within each primary energy source 210a, 210b may monitor and assess the safety of the respective primary energy source 210a, 210b to determine whether the primary energy source 210a, 210b operates within safety margins. For example, the control function may monitor the discharge power, the depth of discharge, and/or the temperature of the respective primary energy source 210a, 210b.

As an example, the control function may determine that the temperature of the respective primary energy source 210a, 210b is outside a safe operating temperature range, and, as a consequence, the primary energy source 210a, 210b may incur the risk of a thermal runaway temperature that can lead to fire. If desired, primary energy source 210a, 210b may generate sensor data 215a, 215b, respectively, to indicate whether primary energy source 210a, 210b is operating in a safe state or whether primary energy source 210a, 210b is at risk of becoming a safety hazard.

If desired, sensor data 215a, 215b may include information related to the power, energy, and health condition of the respective primary energy source 210a, 210b.

Illustratively, hybrid energy storage system 200 may include secondary energy source control adjustment data 235, which may be stored in an appropriate memory device, as an example. If desired, secondary energy source control adjustment data 235 may be stored within secondary energy source control unit 230.

Secondary energy source control adjustment data 235 may provide for the implementation of different control strategies with secondary energy source control unit 230. As an example, based on secondary energy source control adjustment data 235, secondary energy source control unit 230 may send command signals 225a to secondary energy source such that hybrid energy storage system 200 operates in a floating hybrid mode, in which the secondary energy source 220 acts as a buffer for filtering high power demands from energy sinks 240 with the goal of providing a power optimized hybrid energy storage system 200. As another example, based on secondary energy source control adjustment data 235, secondary energy source control unit 230 may send command signals 225a to secondary energy source such that hybrid energy storage system 200 operates in a boosting hybrid mode, in which the secondary energy source 220 acts as an energy source to support power-reduced load intervals with the goal of providing an energy optimized hybrid energy storage system 200.

Figure 3:
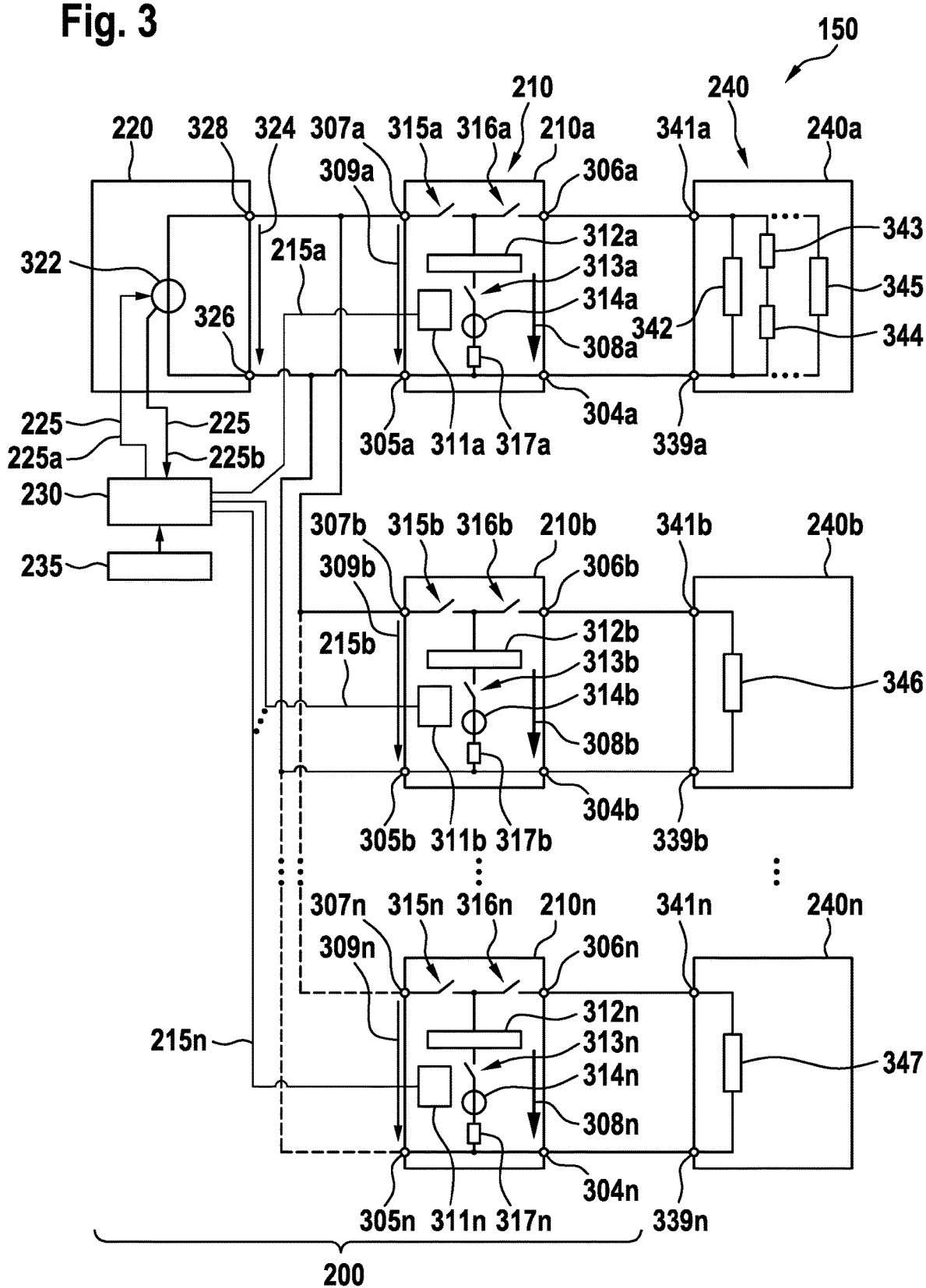
FIG. 3 is a diagram of an illustrative electrical system having a hybrid energy storage system with a secondary energy source and n primary energy sources that supply power to n energy sinks in accordance with some embodiments.

FIG. 3 is a diagram of an illustrative electrical system 150 having a hybrid energy storage system 200 with a single secondary energy source 220 and n primary energy sources 210 that supply power to n energy sinks 240 in accordance with some embodiments.

The n primary energy sources 210 are labelled 210a to 210n and the n energy sinks 240 are labelled 240a to 240n. However, this does not imply that there are exactly 14 primary energy sources 210 and 14 energy sinks 240 that correspond to the 14 letters of the alphabet between a and n. Instead, there can be any number n of primary energy sources 210 and any number n of energy sinks 240.

As shown, each primary energy source 210a to 210n of the n primary energy sources 210 is associated and provides power to exactly one energy sink 240a to 240n of the n energy sinks 240. In other words, each energy sink 240a to 240n of the n energy sinks 240 is coupled to a single primary energy source 210a to 210n of the n primary energy sources 210.

Each energy sink 240a to 240n of energy sinks 240 may have one or more loads (e.g., electrical engines). As an example, energy sink 240a may have loads 342, 343, 344, and 345. Loads 343 and 344 may be coupled in series and parallel to loads 342 and 345. As another example, energy sinks 240b and 240n may each have a single load. Energy sink 240b may have load 346, and energy sink 240n may have load 347. If desired, each energy sink may include a single load.

Each energy sink 240a to 240n of energy sinks 240 may have a negative input port and a positive input output. For example, energy sinks 240a, 240b, and 240n may have negative input ports 339a, 339b, and 339n, respectively, and positive input ports 341a, 341b, and 341n, respectively.

Illustratively, at least one primary energy source of the one or more primary energy sources 210 may include a positive output port and a negative output port. The positive output port and the negative output port of the at least one primary energy source may be coupled to at least one of the energy sinks 240. If desired, each primary energy source 210a to 210n may have a positive output port and a negative output port.

As an example, primary energy sources 210a, 210b, and 210n may include negative output ports 304a, 304b, and 304n, respectively, and positive output ports 306a, 306b, and 306n, respectively. Negative output ports 304a, 304b, and 304n may be coupled to negative input ports 339a, 339b, and 339n of energy sinks 240a, 240b, and 240n, respectively. Positive output ports 306a, 306b, and 306n may be coupled to positive input ports 341a, 341b, and 341n of energy sinks 240a, 240b, and 240n, respectively.

Illustratively, at least one primary energy source of the one or more primary energy sources 210 may include a positive input port and a negative input port. The positive input port and the negative input port of the at least one primary energy source may be coupled to secondary energy source 220. If desired, each primary energy source 210a to 210n may have a positive input port and a negative input port.

As an example, primary energy sources 210a, 210b, and 210n may include negative input ports 305a, 305b, and 305n, respectively, and positive input ports 307a, 307b, and 307n, respectively.

By way of example, the single secondary energy source 220 may include a negative output port 326 and a positive output port 328. As shown, negative output port 326 may be coupled to negative input ports 305a, 305b, and 305n of primary energy sources 210a, 210b, and 210n, respectively, and positive output port 328 may be coupled to positive input ports 307a, 307b, and 307n of primary energy sources 210a, 210b, and 210n, respectively.

Illustratively, each primary energy source 210a to 210n of the primary energy sources 210 may include an energy storage unit that stores electrical energy and supplies power at a predetermined voltage range. For example, primary energy sources 210a, 210b, and 210n may include energy storage units 314a, 314b, and 314n, respectively, that store electrical energy and supply power at predetermined voltage ranges 308a, 308b, and 308n, respectively.

If desired, each primary energy source 210a to 210n of the primary energy sources 210 may include a respective bus bar 312a to 312n that is coupled between the respective energy storage unit 314a to 314n and the respective positive input and output ports 307a to 307n and 306a to 306n. Therefore, the predetermined voltage ranges 308a, 308b, and 308n are sometimes also referred to as bus bar voltages 308a, 308b, and 308n.

Illustratively, at least one primary energy source of primary energy sources 210 may include an input switch that is coupled between the positive input port and the bus bar. As shown, primary energy sources 210a, 210b, and 210n of primary energy sources 210 include input switches 315a, 315b, and 315n, respectively, that are coupled between positive input ports 307a, 307b, and 307n and bus bars 312a, 312b, and 312n, respectively.

As an example, any one of input switches 315a, 315b, or 315n may include at least one of an electromechanical switch, a semiconductor based switch, or a diode in forward current direction to the bus bar. As another example, any one of input switches 315a, 315b, or 315n may include a gate turn-off thyristor, a power metal-oxide field effect transistor, an insulated-gate bipolar transistor, an analogue switch, a relay, or a solid-state relay.

By way of example, at least one primary energy source of primary energy sources 210 may include an output switch that is coupled between the bus bar and the positive output port. As shown, primary energy sources 210a, 210b, and 210n of primary energy sources 210 include output switches 316a, 316b, and 316n, respectively, that are coupled between bus bars 312a, 312b, and 312n and positive output ports 306a, 306b, and 306n, respectively.

As an example, any one of output switches 316a, 316b, or 316n may include at least one of an electromechanical switch or a semiconductor based switch. As another example, any one of output switches 316a, 316b, or 316n may include a gate turn-off thyristor, a power metal-oxide field effect transistor, an insulated-gate bipolar transistor, an analogue switch, a relay, or a solid-state relay.

Illustratively, at least one primary energy source of primary energy sources 210 may include a primary switch that is coupled between the energy storage unit and the bus bar. As shown, primary energy sources 210a, 210b, and 210n of primary energy sources 210 may include primary switch arrangements 313a, 313b, and 313n, respectively, that are coupled between energy storage units 314a, 314b, and 314n and bus bars 312a, 312b, and 312n, respectively.

If desired, at least one primary energy source of primary energy sources 210 may include a protection switch that is coupled between the negative input and output ports and the energy storage unit. As shown, primary energy sources 210a, 210b, and 210n of primary energy sources 210 may include protection switches 317a, 317b, and 317n, respectively, for disconnecting the respective energy storage unit 314a, 314b, or 314n from the negative input and output ports 305a, 304a, 305b, 304b, and 305n, 304n, respectively.

By way of example, at least one primary energy source of the primary energy sources 210 may include an electrical energy source management unit that collects sensor data from the respective energy storage unit. If desired, each primary energy source 210a to 210n of the primary energy sources 210 may include an electrical energy source management unit 311a to 311n that collects respective sensor data 215a to 215n from the respective energy storage unit 314a to 314n.

Respective electrical energy source management units 311a, 311b, and 311n may monitor and assess the safety of the respective primary energy sources 210a, 210b, and 210n to determine whether the respective primary energy sources 210a, 210b, and 210n operate within safety margins. For example, the respective electrical energy source management units 311a, 311b, and 311n may monitor the discharge power, the depth of discharge, and/or the temperature of the respective energy storage units 314a, 314b, and 314n of primary energy sources 210a, 210b, and 210n.

As an example, the respective electrical energy source management units 311a, 311b, and 311n may determine that the temperature of the respective primary energy sources 210a, 210b, and/or 210n are outside a safe operating temperature range, and, as a consequence, the corresponding primary energy source 210a, 210b, or 210n may incur the risk of a thermal runaway temperature that can lead to fire. If desired, the respective electrical energy source management units 311a, 311b, or 311n may generate sensor data 215a, 215b, or 215n, respectively, to indicate whether primary energy source 210a, 210b, or 210n is operating in a safe state or whether primary energy source 210a, 210b, or 210n is at risk of becoming a safety hazard.

If desired, sensor data 215a, 215b, and 215n may include information related to the power, energy, and health condition of the respective primary energy source 210a, 210b, or 210n.

As shown, the respective electrical energy source management unit 311a, 311b, and 311n may send the respective sensor data 215a, 215b, and 215n to secondary energy source control unit 230.

The secondary energy source 220 is coupled to primary energy sources 210 and adapted to supply power at a variable output voltage 324 to the primary energy sources 210. For example, secondary energy source 220 may include a controlled energy source 322 that is adapted to provide the variable output voltage 324. The variable output voltage 324 may be supplied between the positive output port 328 and the negative output port 326 of secondary energy source 220.

Since negative output port 326 is coupled to negative input ports 305a, 305b, and 305n of primary energy sources 210a, 210b, and 210n, respectively, and positive output port 328 to positive input ports 307a, 307b, and 307n of primary energy sources 210a, 210b, and 210n, respectively, variable output voltage 324 is provided as input voltages 309a, 309b, and 309n at primary energy sources 210a, 210b, and 210n, respectively.

If desired, secondary energy source control unit 230 may send command signals 225a to the secondary energy source 220 to control the variable output voltage 324 provided by the controlled energy source 322 based on the sensor data 215a to 215n from the respective electrical energy source management units 311a to 311n.

Illustratively, secondary energy source control unit 230 may receive feedback signals 225b from controlled energy source 322 and send command signals 225a to the secondary energy source 220 to control the variable output voltage 324 provided by the controlled energy source 322 based on the feedback signals 225b.

FIG. 4 is a more detailed diagram of the illustrative electrical system of FIG. 3 showing an electrical system 150 having a hybrid energy storage system 200 with a secondary energy source 420 and a primary energy source 410 that supplies power to an energy sink 440 in accordance with some embodiments.

It should be noted that an electrical system 150 with a single primary energy source 410 that is coupled to a single secondary energy source 420 and a single energy sink 440 is described hereinafter, for simplicity and brevity. However, if desired, the electrical system 150 may include more than one energy sink 440 that is connected to and receives electrical power from primary energy source 410. If there are more than one energy sink, hybrid energy storage system 200 may include more than one primary energy source. As an example, hybrid energy storage system 200 may have two primary energy sources. As another example, hybrid energy storage system 200 may have as many primary energy sources as the electrical system has energy sinks, whereby each primary energy source is associated with and provides electrical power to exactly one energy sink.

In the scenario in which hybrid energy storage system 200 includes more than one primary energy source, hybrid energy storage system 200 may include more than one secondary energy source. If desired, hybrid energy storage system 200 may include as many secondary energy sources as primary energy sources, whereby each secondary energy source is associated with exactly one primary energy source.

Illustratively, energy sink 440 may have one or more loads (e.g., electrical engines). As shown, energy sink 440 may include a DC/AC converter 442, which is sometimes also referred to as a "DC/AC inverter" or simply an "inverter", and a three-phase machine 444. Energy sink 440 may have a negative input port 339 and a positive input output 341 that are coupled to DC/AC converter 442.

Illustratively, primary energy source 410 may include negative output port 404 and positive output port 406. Negative output port 404 may be coupled to negative input port 339 of energy sink 440, and positive output port 406 may be coupled to positive input port 341 of energy sink 440.

By way of example, primary energy source 410 may include a positive input port 407 and a negative input port 405 that are coupled to secondary energy source 220. By way of example, secondary energy source 420 may include negative output port 326 and positive output port 328. As shown, negative output port 326 may be coupled to negative input port 405 of primary energy source 410, and positive output port 328 may be coupled to positive input port 407 of primary energy source 410.

Illustratively, primary energy source may include energy storage unit 414 that stores electrical energy and supplies power at a predetermined voltage range to energy sink 440. If desired, primary energy source 410 may include bus bar 412 that is coupled to the energy storage unit 414.

By way of example, primary energy source 410 may include an input switch 415 and an output switch 416 that are coupled in series between the positive input port 407 and positive output port 406. As an example, input switch 415 may include a diode in forward current direction to bus bar 412 and output switch 416. As another example, output switch 416 may include a contactor that is coupled between bus bar 412 and diode 415, and positive output port 406.

Illustratively, primary energy source 410 may include a primary switch arrangement 413 that is coupled between the energy storage unit 414 and the bus bar 412. As shown, primary switch diode 413a that is arranged in parallel with primary switch contactor 413b may implement primary switch arrangement 413.

If desired, primary energy source 410 may include a protection switch 417 that is coupled between the negative input and output ports 405, 404, and the energy storage unit 414. Protection switch 417 may disconnect energy storage unit 414 from the negative input and output ports 405, 404.

By way of example, primary energy source 410 may include electrical energy source management unit 411. Electrical energy source management unit 411 may collect sensor data from primary energy source 410.

For example, electrical energy source management unit 411 may collect sensor data from energy storage unit 414 to monitor and assess the safety of primary energy source 410 and to determine whether primary energy sources 410 is operating within safety margins. For example, electrical energy source management unit 411 may monitor the discharge power, the depth of discharge, and/or the temperature of primary energy source 410.

As an example, electrical energy source management units 411 may determine that the temperature of primary energy source 410 is outside a safe operating temperature range, and, as a consequence, primary energy source 410 may incur the risk of a thermal runaway temperature that can lead to fire. If desired, electrical energy source management unit 411 may generate sensor data 215a to indicate whether primary energy source 410 is operating in a safe state or whether primary energy source 410 is at risk of becoming a safety hazard.

If desired, sensor data 215a may include information related to the power, energy, and health condition of primary energy source 410. As shown, electrical energy source management unit 411 may send sensor data 215a to secondary energy source control unit 230. Secondary energy source control unit 230 may receive the sensor data 215a from the electrical energy source management unit 411 and, in response, send command signals 225a to the secondary energy source 420.

The secondary energy source 420 is coupled to primary energy sources 410 and adapted to supply power at a variable output voltage 324 to the primary energy sources 410. For example, secondary energy source control unit 230 may send command signals 225a to the secondary energy source 420 to control the variable output voltage 324 based on the sensor data 215a.

Secondary energy source 420 may include an energy storage component 422. Energy storage component 422 may include at least one of a battery, a supercapacitor, an ultracapacitor, a fuel cell, or an engine-generator set.

Illustratively, secondary energy source 420 may include a voltage control unit 426. Voltage control unit 426 may include at least one of a rectifier 426, a DC/AC converter, a DC/DC converter 426, or a stabilizing buffer 428. Buffer 428 may be coupled between the positive and negative output ports 328, 326 of secondary energy source 420.

Voltage control unit 426 may be coupled between energy storage component 422 and positive and negative output ports 328, 326. Voltage control unit 426 may provide variable output voltage 324 at positive and negative output ports 328, 326 based at least in part on the command signals 225a.

Since negative output port 326 is coupled to negative input port 405 of primary energy source 410, and positive output port 328 to positive input port 407 of primary energy source 410, variable output voltage 324 is provided as input voltage to primary energy source 410.

By way of example, voltage control unit 426 may send feedback signals 225b to the secondary energy source control unit 230. The command signals 225a from the secondary energy source control unit 230 may be based at least in part on the feedback signals 225b.

Based on the secondary energy source control adjustment data 235, secondary energy source control unit 230 may control the contribution of secondary energy source 420 within the hybrid energy storage system 200.

Illustratively, secondary energy source control unit 230 of hybrid energy storage system 200 may operate independently from the monitoring and/or protection functions of electrical energy source management unit 411 and vice versa. Thereby, electrical energy source management unit 411 may safeguard primary energy source 410 from abusive conditions with strategies that are different and independent from the goals of secondary energy source control unit 230.

As an example, electrical energy source management unit 411 may open primary switch contactor 413b and/or protection switch 417 to safeguard primary energy source 410 from overload, over-voltage, and/or overheating conditions. As another example, electrical energy source management unit 411 may open output switch 416 to isolate primary energy source 410 from overload conditions at energy sink 440.

By way of example, secondary energy source control unit 230 may, based on the sensor data 215a from electrical energy source management unit 411, but independently from electrical energy source management unit 411, adjust variable output voltage 324 according to the defined energy or power optimization goals (e.g., provided by secondary energy source control adjustment data 235) and considering the boundary conditions of secondary energy source 420.

The hybrid energy storage system 200 can be designed in a way that the individual sizing of primary and secondary energy sources 410, 420 is correctly considering all possible failure scenarios. As an example, secondary energy source 420 is sized based on a potential loss of primary energy source 410. As another example, primary energy source 410 is sized based on a potential loss of secondary energy source 420. As yet another example, sizing of primary and secondary energy sources 410, 420 may take into account the power demand for individual over-power and/or over-energy at energy sinks 440 (e.g. sizing for emergency power load profiles).

Thus, hybrid energy storage system 200 may be realized in a very failure robust and safe way. Robustness and the mutual independency of the electrical energy source management unit 411 and the secondary source control unit 230, both contribute to a reduced complexity of hybrid energy storage system 200.

Due to the reduced complexity of the secondary energy source control unit 230, even an analogue control loop 225, based on simple discrete electronic hardware without a need for software may be implemented, thereby further reducing the complexity of hybrid energy storage system 200. A hybrid energy storage system 200 with a significantly reduced complexity is easing vehicle certification efforts, reducing development costs, and reducing recurring costs.

In a first scenario, secondary energy source control unit 230 may direct secondary energy source 420 to act as buffer for filtering high power demands from energy sink 440, thereby decoupling secondary energy source 420 from primary energy source 410.

In this first scenario, secondary energy source control unit 230 is aiming at providing a power optimized hybrid energy storage system 200, in which secondary energy source 420 acts as an emergency or backup energy source for primary energy source 410. For example, secondary energy source 420 may ensure an uninterrupted power supply at energy sink 440 in case of a degraded performance or loss of primary energy source 410.

Therefore, in this first scenario, secondary energy source control unit 230 may direct secondary energy source 420 to provide variable output voltage 324 at a value, which is the smaller than the output voltage (i.e., the voltage between positive output port 406 and negative output port 404) of primary energy source 410 or smaller than at least one of the output voltages 308a to 308n of all n primary energy sources 210a to 210n of FIG. 3 when all n primary energy sources 210a to 210n are working normal and are contributing to supply the respective energy sink 240a to 240n.

If desired, a secondary source minimum limit output voltage for variable output voltage 324 may be considered in order to comply with the minimum input voltage range of the connected energy sink 440 (or the n energy sinks 240a to 240n of FIG. 3). Thus, in this first scenario, the variable output voltage may be set to a first value, which is selected in the interval delimited by secondary source minimum limit output voltage for the variable output voltage and the output voltage of primary energy source 410 (or the minimum output voltage of any one of the output voltages 308a to 308n of all n primary energy sources 210a to 210n of FIG. 3). Furthermore, a constant forward voltage may be subtracted from the variable output voltage 324 to prevent conductivity in case input switch 315a to 315n is implemented by diodes (e.g., input voltage 509 of FIG. 5A may be at least 0.7V smaller than bus voltage 508 to decouple output voltage from input voltage).

In this first scenario, primary energy source 410 is electrically decoupled from secondary energy source 420 if the output voltage of primary energy source 410 is greater than the first value. Similarly, in this first scenario, all primary energy sources 210a to 210n of FIG. 3, whose output voltages 308a to 308n are greater that the first value, are electrically decoupled from secondary energy source 220.

Figure 5A:
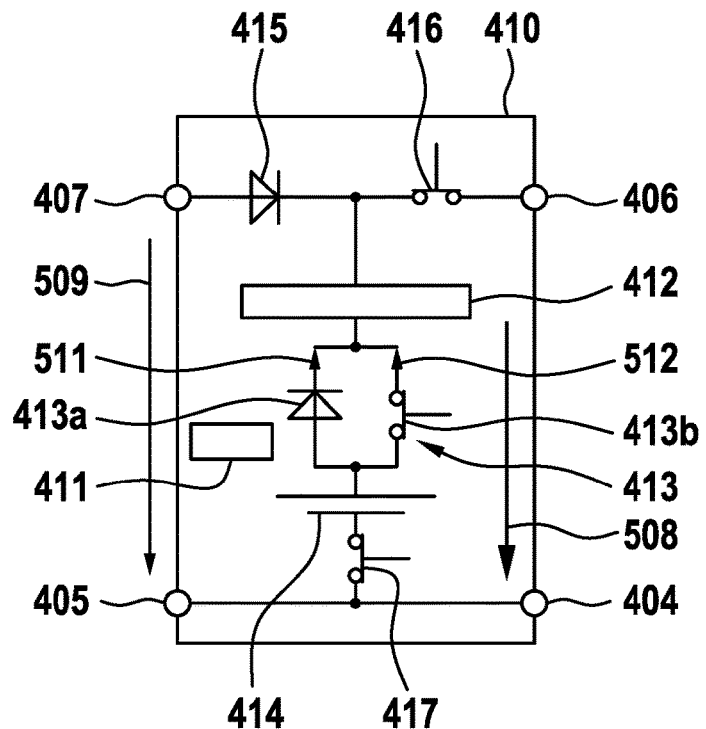
FIG. 5A is a diagram of the illustrative primary energy source of FIG. 4 in a first state in accordance with some embodiments.

Figure 5A is a diagram of the illustrative primary energy source 410 of FIG. 4 in this first state in accordance with some embodiments. In this first state, input voltage 509 is smaller than output voltage 508, which is sometimes also referred to as bus bar voltage 508.

Thus, primary energy source 410 is exclusively contributing to supply power to the assigned energy sink (e.g., energy sink 440 of FIG. 4) and no current is flowing through diode 415. In other words, output switch 416 and protection switch 417 are both closed, and a current is flowing from energy storage unit 414 via primary switch arrangement 413, output switch 416, positive output port 406 through the energy sink and back via negative output port 404 and protection switch 417 to energy storage unit 414 (i.e., primary switch diode current 511 is greater than zero and primary switch contactor current 512 is greater than zero).

Primary energy source 410 operates in this first state in which primary energy source 410 is exclusively contributing to supply power to the assigned energy sink. Primary energy source 410 also operates in this first state when the secondary energy source of the hybrid energy storage system (e.g., secondary energy source 420 of hybrid energy storage system 200 of FIG. 4) is failing. In other words, the hybrid energy storage system operates as an uninterrupted power supply to the energy sink when the secondary energy source is failing.

In other words, primary energy source 410 is independently buffering all secondary energy source transients or continuous power and/or voltage drops. If desired, primary energy source 410 may be sized to sustain all secondary energy source failure scenarios for a given emergency time interval.

However, secondary energy source 220 may act as a buffer if output voltage 508 drops below input voltage 509. For example, energy storage unit 414 may be a non-controlled voltage source (e.g., a battery), and a transient high load may cause the output voltage 508 to drop below the input voltage 509 of primary energy source 410.

In this example, the secondary energy source 220 may temporarily take over the power peaks that cause the output voltage drops, thereby buffering the transient high load. As a result, the size of the energy storage unit 414, and thus the size of primary energy source 410, may be reduced, In a second scenario, a secondary energy source control unit (e.g., secondary energy source control unit 230 of FIG. 4) may direct the secondary energy source (e.g., secondary energy source 420 of FIG. 4) to support power-reduced load intervals. In this second scenario, the secondary energy source control unit is aiming at providing an energy optimized hybrid energy storage system (e.g., hybrid energy storage system 200 of FIG. 4), in which the secondary energy source acts as a range extender for primary energy source 410.

Therefore, in this second scenario, the secondary energy source control unit may direct the secondary energy source to provide a variable output voltage (e.g., variable output voltage 324 of FIG. 4), and thereby input voltage 509 at a value, which is greater than the output voltage 508 (i.e., the voltage between positive output port 406 and negative output port 404) of primary energy source 410 or greater than at least one of the output voltages 308a to 308n of all n primary energy sources 210a to 210n of FIG. 3 when all n primary energy sources 210a to 210n are working normal and are contributing to supply the respective energy sink 240a to 240n.

If desired, a secondary source maximum limit output voltage for the variable output voltage may be considered in order to comply with the maximum input voltage range of the connected energy sink (e.g., energy sink 440 of FIG. 4 or the n energy sinks 240a to 240n of FIG. 3). Thus, in this second scenario, the variable output voltage may be set to a second value, which is selected in the interval delimited by the secondary source maximum limit output voltage for the variable output voltage and the output voltage of primary energy source 410 (or the maximum output voltage of any one of the output voltages 308a to 308n of all n primary energy sources 210a to 210n of FIG. 3).

Furthermore, a constant forward voltage may be added to the variable output voltage 324 to enable conductivity in case input switch 315a to 315n is implemented by diodes (e.g., input voltage 509 of FIG. 5A may be at least 0.7V higher than bus voltage 508 to couple output voltage to input voltage).

In this second scenario, primary energy source 410 is electrically coupled to the secondary energy source through diode 415 if the output voltage of primary energy source 410 is smaller than the second value. Similarly, in this second scenario, all primary energy sources 210a to 210n of FIG. 3, whose output voltages 308a to 308n are smaller than the second value, are electrically coupled through input switch 315a to 315n to secondary energy source 220.

Figure 5B:
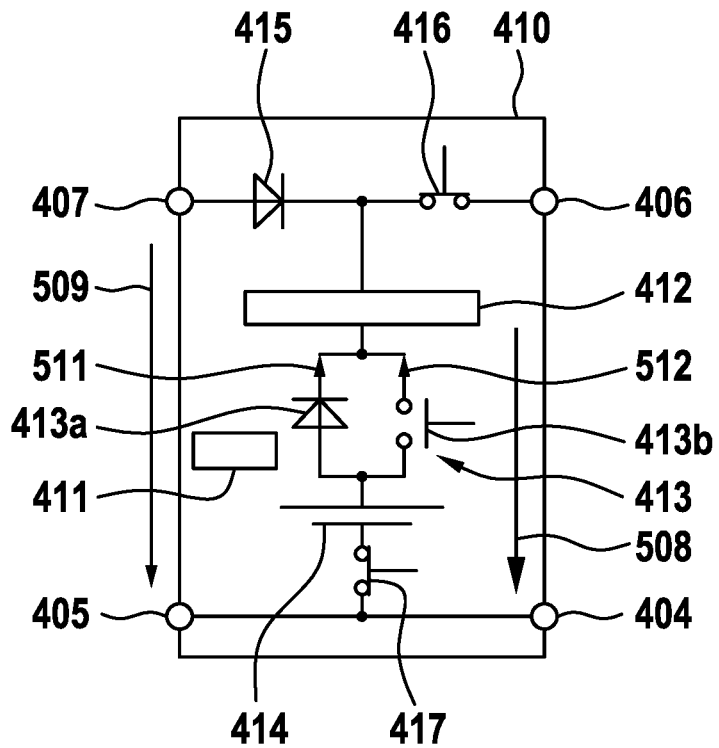
FIG. 5B is a diagram of the illustrative primary energy source of FIG. 4 in a second state in accordance with some embodiments.

FIG. 5B is a diagram of the illustrative primary energy source of FIG. 4 in a second state in which the primary energy source implements the second scenario in accordance with some embodiments. In this second state, input voltage 509 is greater than output voltage 508, output switch 416 and protection switch 417 are both closed, and primary switch contactor 413b is open.

Thus, primary energy source 410 is not contributing to supply power to the assigned energy sink (e.g., energy sink 440 of FIG. 4) and no current is flowing through primary switch diode 413a. In other words, a current is flowing from the secondary energy source (e.g., secondary energy source 420 of FIG. 4) via positive input port 407, input switch 415, output switch 416, positive output port 406 through the energy sink and back via negative output port 404 and negative input port 405 to the secondary energy source (i.e., primary switch diode current 511 is zero).

Nevertheless, depending on the load conditions at energy sink 440 (e.g., with power transients) and the control loop 225 between secondary energy source 420 and secondary energy source control unit 230 of FIG. 4, the output voltage 324 of secondary energy source 420 may temporarily drop below the output voltage of primary energy source 410. If the output voltage of the secondary energy source drops below the output voltage of primary energy source 410, energy storage unit 414 is then able to buffer the energy sink with an additional current that flows from energy storage unit 414 via primary switch diode 413a, output switch 416, and positive output port 406 to the energy sink, even though the secondary energy source remains the main contributor of power supply to the energy sink.

In a third scenario, primary energy source 410 has a weak power and energy condition and primary switch contactor 413b is closed. In this third scenario and depending on the voltage difference between output voltage 508 and input voltage 509, a current can flow from secondary energy source 420 via positive input port 407, input switch 415, and primary switch contactor 413b into energy storage unit 414.

This third scenario may be beneficial to recover or recharge energy storage unit 414 during load and/or discharge operation of hybrid energy storage system 200. This third scenario may also be used to adjust the output voltages 308a to 308n of all primary energy sources 210a to 210n of FIG. 3 to one common voltage level, which may be beneficial for optimizing the life time of the hybrid energy storage system 200, for harmonizing the charge levels at the respective primary energy sources 210a to 210n, and for shortening the recharging times of hybrid energy storage system 200.

Figure 5C:
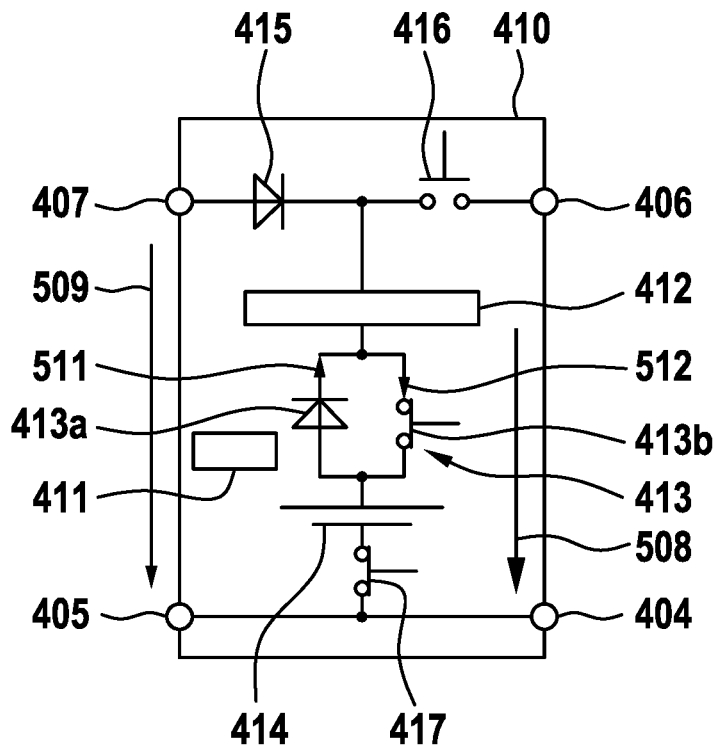
FIG. 5C is a diagram of the illustrative primary energy source of FIG. 4 in a third state in accordance with some embodiments.

FIG. 5C shows the illustrative primary energy source 410 of FIG. 4 in a third state that implements the third scenario in accordance with some embodiments. In this third state, input voltage 509 is greater than output voltage 508, and protection switch 417 and primary switch contactor 413b are closed, while output switch 416 is open.

Thus, the energy sink is decoupled from primary energy source 410 and the secondary energy sink (e.g., energy sink 440 of FIG. 4 is at least temporarily not mission-critical) to relieve power from the charging source and to secure the energy sink (e.g., to prevent undesired consumption). Thus, no current is flowing through primary switch diode 413a. However, a recharging current is flowing from the secondary energy source via positive input port 407, input switch 415, and primary switch contactor 413b to energy storage unit 414, which is charged by this current.

However, the recharging current may be higher than a limiting threshold. The limiting threshold may be defined within the electrical energy source management unit 411 of primary energy source 410. As a result, the primary switch contactor 413b may be steered open or temporarily opened by electrical energy source management unit 411 to prevent overcharge conditions.

If desired, output switch 416 may be closed in the third scenario. For example, energy sink 440 of FIG. 4 may perform a mission-critical operation and the hybrid energy storage system 200 is required to supply power to energy sink 440. Thus, energy sink 440 may be coupled to primary energy source 410 and secondary energy source 420.

As a result, no current is flowing through primary switch diode 413a. However, a current is flowing from the secondary energy source through positive input port 407 and input switch 415. A first portion of this current is flowing from input switch 415 via primary switch contactor 413b to energy storage unit 414, which is charged by this current. A second portion of this current is flowing from input switch 415 via output switch 416 and through the energy sink via negative output port 404 and negative input port 405 to the secondary energy source.

In a fourth scenario, primary energy source 410 may be failing. If desired, electrical energy source management unit 411 may open primary switch contactor 413b and protection switch 417 to isolate energy storage unit 414 from the energy sink and the secondary energy source.

Figure 5D:
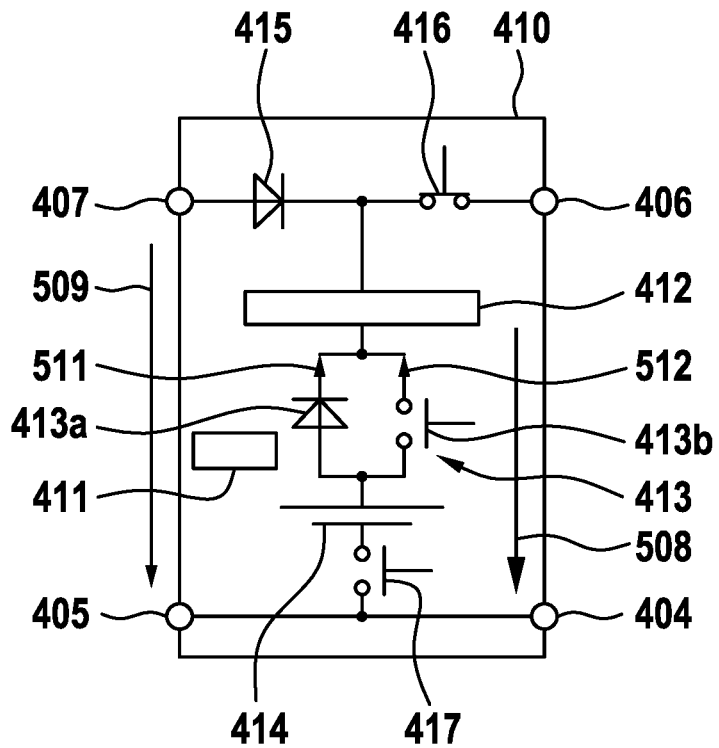
FIG. 5D is a diagram of the illustrative primary energy source of FIG. 4 in a fourth state in accordance with some embodiments.

FIG. 5D is a diagram of the illustrative primary energy source of FIG. 4 in a fourth state that implements the fourth scenario in accordance with some embodiments.

In this fourth scenario, the hybrid energy storage system 200 of FIG. 4 may operate as an uninterrupted power supply to the connected energy sink 440. In particular, the energy sink 440 may receive power from the secondary energy source 420 of FIG. 4.

In other words, a current is flowing from the secondary energy source (e.g., secondary energy source 420 of FIG. 4) via positive input port 407, input switch 415, output switch 416, positive output port 406 through the energy sink and back via negative output port 404 and negative input port 405 to the secondary energy source (i.e., primary switch diode current 511 is zero).

If desired, the secondary energy source may be sized to provide enough power and energy to cover all potential primary energy source 410 failure conditions for a given emergency time interval (e.g., until the vehicle is recovering, stabilizing, in a steady state, or has performed an emergency landing).

In a fifth scenario, the energy sink (e.g., energy sink 440 of FIG. 4) may reach an overload situation. For example, the energy sink may have a short-circuit. In this fifth scenario, the electrical energy source management unit 411 may protect primary energy source 410 by opening the output switch 416, thereby isolating the failing energy sink and by opening the protection switch 417 to prevent overload currents at the energy storage unit 414.

Figure 5E:
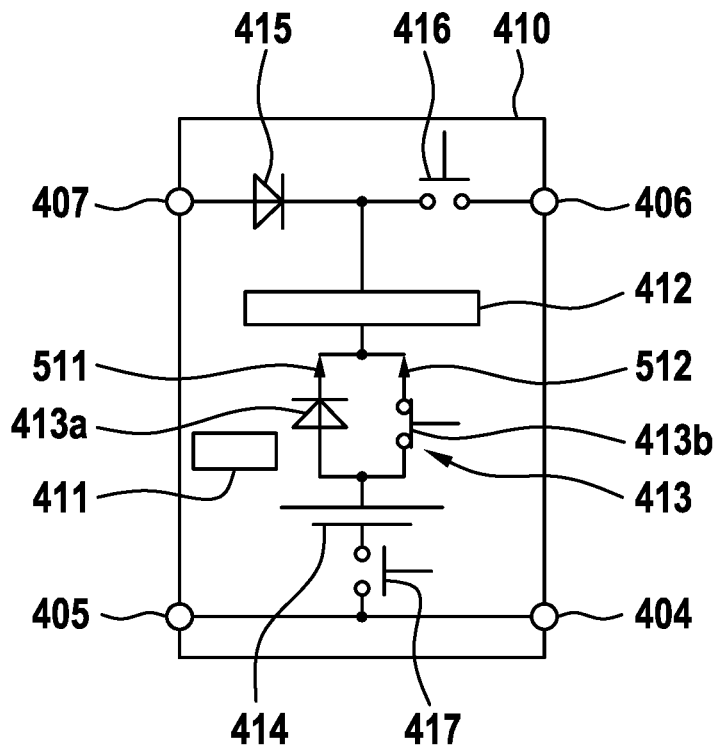
FIG. 5E is a diagram of the illustrative primary energy source of FIG. 4 in a fifth state in accordance with some embodiments.

FIG. 5E is a diagram of the illustrative primary energy source 410 of FIG. 4 in a fifth state that implements the fifth scenario in accordance with some embodiments.

In a sixth scenario, secondary energy source control unit 230 may direct secondary energy source 420 to provide variable output voltage 324 at a value that is greater than the secondary source minimum limit output voltage and greater than the smallest output voltage of any one of the output voltages 308a to 308n of all n primary energy sources 210a to 210n of FIG. 3.

In this sixth scenario, a first strong and/or charged primary energy source of primary energy sources 210a to 210n may operate as in the first scenario and be configured as shown in FIG. 5A, while a second weak and/or discharged primary energy source of primary energy sources 210a to 210n operates as in the second scenario and is configured as shown in FIG. 5B. In other words, the first strong and/or charged primary energy source may behave as described in FIG. 5A, while the second weak and/or discharged primary energy source behaves as described in FIG. 5B.

It should be noted that modifications to the above described embodiments are within the common knowledge of the person skilled in the art and, thus, also considered as being part of the present invention.

For instance, all components of primary and secondary energy sources of FIGS. 3 to 5E (i.e., all components of hybrid energy storage system 200) may have an opposite polarity compared to what is shown in FIGS. 3 to 5E without changing the functionality of the hybrid energy storage system. As an example, energy storage unit 414 of FIGS. 4 to 5E may be installed such that its negative pole is connected to input switch 407, bus bar 412, and output switch 416 and its positive pole to protection switch 417 such that primary energy source 410 has positive input port 405, positive output port 404, negative input port 407, and negative output port 406. Furthermore, diodes 413a and 415 would be connected in opposite direction.

Moreover, buffer 428 of FIG. 4 is shown as a standalone part of secondary energy source 420. However, buffer 428 may be implemented by two or more parallel buffers. Alternatively, or in addition, buffer 428 may be implemented as part of voltage control unit 426. If desired, buffer 428 may be arranged outside of secondary energy source 420 between secondary energy source 420 and primary energy source 410.

Furthermore, it may be desirable to adjust the optimization goals of the hybrid energy storage system 200 of FIG. 4 during vehicle operation and depending on the vehicle's operation mode (e.g., during power intensive operation phases during takeoff and landing, or during energy intensive operation during cruise flight phases). Thus, secondary energy source control unit 230 may command voltage control unit 426 to adapt variable output voltage 324 based on the optimization goals of hybrid energy storage system 200.

REFERENCE LIST 100 aircraft
102 aircraft airframe, fuselage
102a aircraft airframe internal volume
103 thrust producing units
103a, 103b thrust producing unit
104 thrust producing units support structure
104a, 104b thrust producing units support structure member
105a, 105b fail-safe electrical drive unit
106 shrouding units
106a, 106b shrouding
108 rotor assemblies
108a, 108b rotor assembly
113 outer shell
150 electrical system
200 hybrid energy storage system
210 one or more primary energy sources
215a, 215b, 215n sensor data
210a, 210b, 210n primary energy source
220 secondary energy source
225 control loop
225a command signals
225b feedback signals
230 secondary energy source control unit
235 secondary energy source control adjustment data
240 one or more energy sinks
240a, 240b, 240n energy sink
304a, 304b, 304n negative output port
305a, 305b, 305n negative input port
306a, 306b, 306n positive output port
307a, 307b, 307n positive input port
308a, 308b, 308n bus bar voltage
309a, 309b, 309n input voltage
311a, 311b, 311n electrical energy source management unit
312a, 312b, 312n bus bar
313a, 313b, 313n primary switch arrangement
314a, 314b, 314n energy source, energy storage unit
315a, 315b, 315n input switch
316a, 316b, 316n output switch
317a, 317b, 317n protection switch
322 controlled energy source
324 output voltage
326 negative output port
328 positive output port
339a, 339b, 339n negative input port
341a, 341b, 341n positive input port
342, 343, 344, 345, 346, 347 load
404 negative output port
405 negative input port
406 positive output port
407 positive input port
410 primary energy source
411 electrical energy source management unit
412 bus bar
413 primary switch arrangement
413a primary switch diode
413b primary switch contactor
414 energy source, energy storage unit
415 input switch, diode
416 output switch, contactor
417 protection switch
420 secondary energy source
422 energy storage component
426 voltage control unit, rectifier, inverter, DC/DC converter, DC/AC converter
428 buffer
440 energy sink
442 DC/AC converter, inverter
444 three-phase machine
508 bus bar voltage
509 input voltage
511 primary switch diode current
512 primary switch contactor current

What is claimed is:

1. An electrical system for an aircraft, comprising:
one or more energy sinks, wherein each energy sink of the one or more energy sinks comprises a load; and
a hybrid energy storage system, comprising:

one or more primary energy sources that are coupled to the one or more energy sinks and supply power to the one or more energy sinks, wherein each primary energy source of the one or more primary energy sources comprises:
  an energy storage unit that stores electrical energy and supplies power at a predetermined voltage range, and
  an electrical energy source management unit that collects sensor data from the energy storage unit;
a secondary energy source that is coupled to the one or more primary energy sources and adapted to supply power at a variable output voltage to the one or more primary energy sources; and
a secondary energy source control unit that receives the sensor data from the electrical energy source management unit and sends command signals to the secondary energy source to control the variable output voltage based on the sensor data, wherein the secondary energy source control unit is adapted to directing the secondary energy source to adjust the variable output voltage to a value that is smaller than the predetermined voltage range of at least one of the one or more primary energy sources and is adapted to directing the secondary energy source to adjust the variable output voltage to a value that is greater than the predetermined voltage range of the at least one of the one or more primary energy sources.

2. The electrical system of claim 1, wherein the secondary energy source further comprises:
  a negative output port; and
  a positive output port, wherein the variable output voltage is supplied between the positive output port and the negative output port.

3. The electrical system of claim 2, wherein the secondary energy source further comprises:
  a buffer that is coupled between the positive and negative output ports.

4. The electrical system of claim 2, wherein the secondary energy source further comprises:
  an energy storage component that comprises at least one of a battery, a supercapacitor, an ultracapacitor, a fuel cell, or an engine-generator set.

5. The electrical system of claim 4, wherein the secondary energy source further comprises:
  a voltage control unit that is coupled between the energy storage component and the positive and negative output ports, wherein the voltage control unit supplies the variable output voltage between the positive and negative output ports based at least in part on the command signals.

6. The electrical system of claim 5, wherein the voltage control unit sends feedback signals to the secondary energy source control unit, and wherein the command signals from the secondary energy source control unit are based at least in part on the feedback signals.

7. The electrical system of claim 5, wherein the voltage control unit comprises at least one of a rectifier, a DC/AC converter, a DC/DC converter, or a stabilizing buffer.

8. The electrical system of claim 1, wherein an energy sink of the one or more energy sinks comprises:
  a three-phase AC machine; and
  a DC/AC converter that is coupled between a primary energy source of the one or more primary energy sources and the three-phase AC machine.

9. The electrical system of claim 1, wherein each primary energy source of the one or more primary energy sources supplies power to exactly one energy sink of the one or more energy sinks.

10. The electrical system of claim 1, wherein at least one primary energy source of the one or more primary energy sources further comprises:
  a positive input port;
  a negative input port, wherein the positive and negative input ports are coupled to the secondary energy source;
  a positive output port;
  a negative output port, wherein the positive and negative output ports are coupled to at least one of the one or more energy sinks; and
  a bus bar that is coupled between the energy storage unit and the positive input and output ports.

11. The electrical system of claim 10, wherein the at least one primary energy source of the one or more primary energy sources further comprises:
  a primary switch arrangement that is coupled between the energy storage unit and the bus bar.

12. The electrical system of claim 11, wherein the primary switch arrangement further comprises:
  a primary switch diode that is arranged in forward direction from the energy storage unit to the bus bar; and
  a primary switch contactor that is arranged in parallel to the primary switch diode between the energy storage unit and the bus bar.

13. The electrical system of claim 10, wherein the at least one primary energy source of the one or more primary energy sources further comprises:
  an input switch that is coupled between the positive input port and the bus bar, wherein the input switch comprises at least one of an electromechanical switch, a semiconductor based switch, or a diode in forward current direction to the bus bar.

14. The electrical system of claim 10, wherein the at least one primary energy source of the one or more primary energy sources further comprises:
  an output switch that is coupled between the bus bar and the positive output port, wherein the output switch comprises at least one of an electromechanical switch or a semiconductor based switch.

15. The electrical system of claim 10, wherein the at least one primary energy source of the one or more primary energy sources further comprises:
  a protection switch that is coupled between the negative input and output ports and the energy storage unit for disconnecting the energy storage unit from the negative input and output ports, wherein the protection switch comprises at least one of an electromechanical switch, a semiconductor based switch, a fuse, or a circuit breaker.

16. The electrical system of claim 1, wherein the secondary energy source control unit directs the secondary energy source to adjust the variable output voltage to a value that is smaller than the predetermined voltage range of the at least one of the one or more primary energy sources whereby the secondary energy source acts as an emergency or backup energy source for the at least one of the one or more primary energy sources.

17. The electrical system of claim 1, wherein the secondary energy source control unit directs the secondary energy source to adjust the variable output voltage to a value that is greater than the predetermined voltage range of the at least one of the one or more primary energy sources whereby the secondary energy source acts as a range extender for the at least one of the one or more primary energy sources.

* * * * *